United States Patent Office 3,642,656
Patented Feb. 15, 1972

3,642,656
REGENERATION OF A COKE-DEACTIVATED CATALYST CONTAINING PLATINUM AND RHENIUM
John C. Hayes, Palatine, Ill., assignor to Universal Oil Products Company, Des Plaines, Ill.
No Drawing. Continuation-in-part of applications Ser. No. 797,272, Feb. 6, 1969, and Ser. No. 815,183, Apr. 10, 1969. This application Oct. 16, 1969, Ser. No. 867,077
Int. Cl. B01j 11/18, 11/04
U.S. Cl. 252—419
13 Claims

ABSTRACT OF THE DISCLOSURE

A deactivated hydrocarbon conversion catalyst—which is a combination of a platinum group component, a rhenium component, a halogen component and a sulfur component with an alumina carrier material, which contains the platinum group component and the rhenium component in amounts sufficient to result in the atomic ratio of platinum group metal to rhenium metal being greater than 1:1 and which has been deactivated by deposition of carbonaceous materials thereon during a previous contacting with a hydrocarbon charge stock at hydrocarbon conversion conditions—is regenerated by the sequential steps of: (a) stripping sulfur therefrom at a relatively high temperature with a substantially sulfur-free hydrogen stream; (b) purging hydrogen from contact with the catalyst; (c) burning coke from the resulting catalyst at relatively low temperatures with a substantially sulfur-free gas stream containing a relatively small amount of $O_2$; (d) treating the resulting substantially carbon-free catalyst with oxygen at a relatively high temperature; (e) purging oxygen and water from contact with the catalyst with an inert gas stream; and (f) reducing the resulting catalyst by contacting same with a substantially sulfur-free and water-free hydrogen stream at an elevated temperature.

CROSS-REFERENCES TO RELATED APPLICATION

This application is a continuation-in-part of my application Ser. No. 815,183, filed Apr. 10, 1969, and also of my application Ser. No. 797,272 filed Feb. 6, 1969.

DISCLOSURE

The subject of the present invention is a method for regenerating a coke-deactivated hydrocarbon converison catalyst comprising a combination of a platinum group component, a rhenium component, a halogen component and a sulfur component with an alumina carrier material where the catalyst contains the platinum group component and the rhenium component in amounts sufficient to result in the atomic ratio of platinum group metal to rhenium metal being greater than 1:1 and where the catalyst has been deactivated by the deposition of carbonaceous materials thereon during a previous contacting with a hydrocarbon charge stock at hydrocarbon conversion conditions. In essence, the present invention provides a specific sequence of steps involving sulfur-stripping, carbon-burning, oxygen-treating and catalyst reduction, which steps are designed to result in a regenerated catalyst possessing activity, selectivity and stability characteristics which are equivalent to those observed with the fresh, undeactivated catalyst.

Composites having a hydrogenation-dehydrogenation function and a cracking function are widely used today as catalysts in many industries, such as the petroleum and petro-chemical industry, to accelerate a wide spectrum of hydrocarbon conversion reactions. Generally, the cracking function is thought to be associated with an acid-acting material of the porous, adsorptive, refractory oxide type which is typically utilized as the support or carrier for a heavy metal component such as one or more of the metals or compounds of metals of Group V through VIII of the Periodic Table to which are generally attributed the hydrogenation-dehydrogenation function.

These catalytic composites are used to accelerate a wide variety of hydrocarbon conversion reactions such as hydrocracking, isomerization, dehydrogenation, hydrogenation, desulfurization, cyclization, alkylation, polymerization, cracking, hydroisomerization, etc. In many cases, the commercial applications of these catalysts are in processes where more than one of these reactions are proceeding simultaneously. An example of this latter type of process is reforming wherein a hydrocarbon feed stream containing paraffins and naphthenes is subjected to conditions which promote dehydrogenation of naphthenes to aromatics, isomerization of paraffins and naphthenes, hydrocracking of naphthenes and paraffins and the like reactions, to produce an octane-rich and aromatic-rich product stream. Another example is a hydrocracking process wherein catalysts of this type are utilized to effect selective hydrogenation and cracking of high molecular weight unsaturated materials, selective hydrocracking of high molecular weight materials, and other like reactions, to produce a generally lower boiling, more valuable output stream. Yet another example is an isomerization process wherein a hydrocarbon fraction which is relatively rich in straight-chain paraffin components is contacted with a dual-function catalyst to produce an output stream rich in isoparaffin compounds.

Regardless of the reaction involved or the particular process involved, it is of critical importance that the dual-function catalyst exhibit not only the capability to initially perform the specified functions, but also that it has the capability to perform them satisfactorily for prolonged periods of time. The analytical terms used in the art to measure how well a particular catalyst performs its intended functions in a particular hydrocarbon reaction environment are activity, selectivity, and stability. And for purposes of discussion here, these terms are conveniently defined for a given charge stock as follows: (1) activity is a measure of the catalyst's ability to convert hydrocarbon reactants into products at a specified severity level where severity level means the conditions used—that is, the temperature, pressure, contact time, and presence of diluents such as $H_2$; (2) selectivity refers to the weight or volume percent of the reactants that are converted into the desired product and/or products; (3) stability refers to the rate of change with time of the activity and selectivity parameters—obviously the smaller rate implying the more stable catalyst. In a reforming process, for example, activity commonly refers to the amount of conversion that takes place for a given charge stock at a specified severity level and is typically measured by octane number of $C_5+$ product stream; selectivity refers to the amount of $C_5+$ yield that is obtained at the particular severity level; and stability is typically equated to the rate of change with time of activity, as measured by octane number of $C_5+$ product, and of selectivity, as measured by $C_5+$ yield. Actually, the last statement is not strictly correct because generally a continuous reforming process is run to produce a constant octane $C_5+$ product with the severity level being continuously adjusted to attain this result; and, furthermore, the severity level is for this process usually varied by adjusting the conversion temperature in the reaction zone so that, in point of fact, the rate of change of activity finds response in the rate of change of conversion temperature, and changes in this last parameter are customarily taken as indicative of activity and stability.

As is well known to those skilled in the art, the principal cause of observed deactivation or instability of these dual-function catalysts, when they are used in a hydrocarbon conversion process, is associated with the formation of coke or carbonaceous materials on the surface of the catalyst during the course of the reaction. More specifically, the conditions utilized in these hydrocarbon conversion processes typically result in the formation of heavy, black, solid or semisolid carbonaceous material which deposit on the surface of the catalyst and gradually reduce its activity by shielding its active sites from the reactants. Recently, there has been developed a new dual-function catalytic composite which possesses improved activity, selectivity, and stability characteristics when it is employed in a process for the conversion of hydrocarbons of the type which has heretofore utilized dual-function catalytic composites such as processes for isomerization, dehydrogenation, hydrogenation, alkylation, transalkylation, dealkylation, cyclization, dehydrocyclization, cracking, hydrocracking, reforming, and the like processes. In particular, it has been determined that a combination of a platinum group component, a rhenium component, and a halogen component with an alumina carrier material enables the performance of hydrocarbon conversion processes utilizing dual-function catalysts to be substantially improved. For example, it has been demonstrated that the overall performance characteristics of a reforming process can be sharply improved by the use of this recently developed catalytic composite. Not unexpectedly, the deactivation of this recently developed dual-function hydrocarbon conversion catalyst occurs in much the same manner as for any other hydrocarbon conversion catalyst having a platinum metal component when it is employed in the hydrocarbon conversion service. According, the principal mode of deactivation of this recently developed catalyst is the deposition of coke, volatile hydrocarbons, and other carbonaceous material on the surface of the catalyst which eventually cover the catalytically active sites of the catalyst, thereby shielding them from the reactants or blocking access of the reactants to the sites. These deposits cause a gradual decline in activity and selectivity of the catalyst and a gradual loss of its capability to perform its intended function. Depending somewhat on the performance requirements imposed on the process utilizing the catalyst, at some point in time the catalyst becomes so clogged with carbonaceous materials that it either must be regenerated or discarded. Heretofore, substantial difficulty has been encountered in regenerating this recently developed hydrocarbon conversion catalyst. More specifically, it has been determined that the application of conventional regeneration techniques, which have long been practiced in the art of regenerating dual-function hydrocarbon conversion catalysts has not been successful in restoring the initial activity, selectivity, and stability characteristics of the catalyst. Typically, attempts at regeneration of this catalyst by a conventional carbon-burning procedure with an oxygen-containing gas has resulted in a regenerated catalyst having an extremely low activity for the conversion of hydrocarbons, and containing a substantially reduced amount of halogen. Attempts at restoring the initial level of halogen contained in the catalyst by well known halogen-adjustment procedures on the regenerated catalyst have been uniformly unsuccessful. When the deactivated catalyst also contains a sulfur component, I have determined that this regeneration problem is greatly magnified and compounded. More specifically, when this recently developed catalyst has bee exposed to contact with sulfur or sulfur-containing compounds, either because of presulfiding or because of the presence of sulfur in the charge stock or because of use of a sulfur additive, the response of the resulting sulfur-containing catalyst to a conventional carbon-burning regeneration procedure is completely negative, and the catalyst is thereby permanently deactivated. In other words, this catalyst is acutely sensitive to the procedure used to regenerate even when it does not contain sulfur, and when sulfur is present, the already difficult regeneration problem increases by an order of magnitude. This discussion of the regeneration problem caused by sulfur is not to be construed as an allegation that the presence of sulfur in the charge stock causes a mode of catalyst deactivation which is independent of the carbon deposition mode explained previously; quite on the contrary, the presence of sulfur in the charge stock can in some cases be highly beneficial. Upon investigation, it appears that the adverse effect of sulfur is primarily associated with the production during regeneration of sulfur oxides which are preferentially retained by the catalyst. These sulfur oxides appear to occupy sites on the alumina carrier material normally occupied by the halogen component, thereby substantially decreasing the halogen retention capacity of the alumina support. Coupled with this observation, I have determined that the presence of the proper amount of the halogen component in the subject catalyst is an essential condition for its possession of superior catalytic properties, and relatively small amounts of sulfur (e.g. 0.1 wt. percent) can have a very drastic effect on the halogen retention capacity of the alumina carrier material with resultant deactivation of the catalyst.

The problem addressed by the present invention is, accordingly, the regeneration of a coke-deactivated hydrocarbon conversion catalyst comprising a combination of a platinum group component, a rhenium component, a halogen component, and a sulfur component with an alumina carrier material.

Based upon my recognition of the acute sensitivity of this catalyst to the presence of sulfur or sulfur oxides during the course of the regeneration procedure, I previously disclosed that a particularly advantageous method of regeneration involved the substantially complete removal of sulfur from this catalyst prior to the burning of any carbon therefrom coupled with the careful control of the gas streams used in the various steps of the regeneration method to exclude therefrom sulfur or sulfur oxides. I have now ascertained that an important parameter groverning the effectiveness of this previously disclosed method of regeneration involves the atomic ratio of platinum group metal to rhenium contained in the catalyst. More precisely, I have determined that particularly beneficial results are obtained with the regeneration method disclosed in my prior application when the catalyst contains, on an atomic basis, more platinum group metal than rhenium metal. That is, the previously disclosed regeneration method yields particularly beneficial results when the atomic ratio of platinum group metal to rhenium contained in the catalyst is greater than 1:1. The reasons for this particularly good response of this high ratio catalyst to this regeneration procedure are not entirely known; however, I attribute at least a part of it to my finding that catalysts containing, on an atomic basis, more platinum group metal than rhenium metal can tolerate significantly greater amounts of sulfur in their environment during the regeneration procedure. In addition, I have discovered that this high ratio catalyst is particularly sensitive to the presence of water during the reduction step, and that superior results are obtained if the catalyst is carefully dried before this step. Consequently, I have found a regeneration method for this high ratio catalyst which, quite surprisingly, restores it to essentially fresh catalyst quality, and essential features of my method are: substantially complete removal of sulfur prior to burning of any carbon from the catalyst, burning of the carbon at a relatively low temperature with a relatively small amount of oxygen, oxygen treating of the partially regenerated catalyst at a relatively high temperature with a relatively larger amount of oxygen, careful drying of the catalyst prior to reduction of same, reduction at a relatively high temperature, and exclusion of sulfur or sulfur compounds from the gas streams used in all major steps thereof.

It is, therefore, a principal object of the present invention to provide a convenient, effective, and simple method for regenearting a hydrocarbon conversion catalyst comprising a combination of a platinum group component, a rhenium component, a halogen component and a sulfur component with an alumina carrier material where the catalyst has been deactivated by contact with a hydrocarbon charge stock at an elevated temperature and where the catalyst contains the platinum group component and the rhenium component in amounts such that the atomic ratio of platinum group metal to rhenium metal is greater than 1:1. A corollary object is to provide a solution to the problem of regenerating this sulfur-containing high metal ratio catalyst which solution enables the production of a regenerated catalyst having activity, selectivity, and stability characteristics which are equivalent to those possessed by the original catalyst. An overall object is to extend the total catalyst life of these recently developed platinum-rhenium catalysts and to obtain more efficient and effective use of these catalysts during their active life.

In brief summary, one embodiment of the present invention is a method for regenerating a deactivated hydrocarbon conversion catalyst comprising a combination of a platinum group component, a rhenium component, a halogen component and a sulfur component with an alumina carrier material where the catalyst has been deactivated by deposition of carbonaceous material thereon during a previous contacting with a hydrocarbon charge stock at hydrocarbon conversion conditions and where the catalys contains the platinum group component and the rhenium component in amounts sufficient to result in the atomic ratio of platinum group metal to rhenium metal being greater than 1:1. The first step of the method involves contacting the deactivated catalyst with a substantially sulfur-free hydrogen stream at a temperature of about 350 to about 600° C. and at a pressure of about 1 to about 50 atmospheres for a period extending until the resulting effluent gas stream is substantially free of hydrogen sulfide. After hydrogen is purged from contact with the catalyst, it is subjected to contact, in the next step, with a substantially sulfur-free first gaseous mixture containing about 0.3 to about 2 vol. percent $O_2$ at a pressure of about 1 to about 7 atmospheres and at a temperature of about 375 to about 500° C. for a period extending until no further substantial combustion of carbonaceous materials is observed. In the next step, the catalyst resulting from the last step is treated with a substantially sulfur-free second gaseous mixture containing about 0.5 to about 10 mole percent $O_2$ for a period of about 0.5 to about 10 hours at a temperature of about 500 to 550° C. and at a pressure of about 1 to about 7 atmospheres. Thereafter, oxygen and water are purged from contact with the resulting catalyst by contacting it with a substantially water-free inert gas stream for a period extending until the resulting effluent gas stream contains less than 100 mole p.p.m. water. In the final step, the resulting dried catalyst is subjected to contact with a substantially water-free and sulfur-free hydrogen stream at a temperature of about 400 to about 600° C. for a final period of about 0.5 to about 5 hours. The resulting regenerated catalyst possesses activity, selectivity and stability characteristics equivalent to those possessed initially by the fresh catalyst.

Other objects and embodiments of the present invention encompass further details about the catalysts that can be regenerated thereby, the conditions and reagents used in each step of the regeneration method, and the mechanics associated with each of these steps. These embodiments and objects will be hereinafter disclosed in the following detailed description of each of the essential and preferred steps of the present invention.

The present invention encompasses a regeneration method which is applicable to a catalyst containing a platinum group component, a rhenium component, a halogen component and a sulfur component combined with an alumina carrier material. Although the regeneration procedure is specifically directed to the regeneration of a composite containing platinum, it is intended to include within its scope other platinum group metals such as palladium, rhodium, ruthenium, osmium, and iridium. The platinum group component may be present in the catalyst as the elemental metal or as a suitable compound such as the oxide, sulfide, etc., although it is generally preferred that it be used in the reduced state. Generally, the amount of the platinum group component present in the final catalyst is relatively small. According to the present invention, the platinum group component is present in an amount sufficient to result in an atomic ratio of platinum group metal to rhenium of greater than 1:1, with best results obtained at a ratio of 1.5:1 to about 10:1. Generally, it is preferred to use a catalyst having a mole ratio of about 1.5:1 to about 5:1. The preferred platinum group component is platinum or a compound of platinum. The platinum group component can be added to the alumina carrier material in any suitable manner, with the preferred procedure involving simultaneous impregnation with the rhenium component as explained below.

Another essential constituent of the catalyst regenerated by the method of the present invention is the rhenium component. This component may be present as an elemental metal or as a chemical compound such as the oxide, sulfide, halide, or in a physical or chemical association with the carrier material and/or other components of the catalyst. Generally, the rhenium component is utilized in an amount sufficient to result in the final catalytic composite containing about 0.01 to about 1 wt. percent rhenium, calculated as an elemental metal with the preferred being about 0.1 to about 0.4 wt. percent. The rhenium component may be incorporated in the catalytic composite in any simple manner and in any stage of the preparation of the catalyst. The preferred procedure for incorporating the rhenium component involves the impregnation of the alumina carrier material either before, during, or after the other components referred to herein are added. The impregnation solution is generally an aqueous solution of a suitable rhenium salt such as ammonium perrhenate, sodium perrhenate, potassium perrhenate, and the like salts. However, the preferred impregnation solution is an aqueous solution of perrhenic acid. The alumina carrier material can, in general, be impregnated with the rhenium component either prior to, simultaneously with, or after the platinum group component is added to the carrier. Best results are achieved when the rhenium compound is impregnated simultaneously with the platinum group component. In fact, a preferred impregnation solution contains chloroplatinic acid, hydrogen chloride and perrhenic acid.

Yet another essential ingredient of the subject catalyst is a halogen component. Although the precise form of the chemistry of the association of the halogen component with the alumina support is not entirely known, it is customary in the art to refer to the halogen component as being combined with the alumina carrier material or with the other ingredients of the catalyst. This combined halogen may be either chlorine, fluorine, iodine, bromine, or mixtures thereof. Of these, chlorine and fluorine are preferred with the best results obtained with chlorine. The halogen may be added to the alumina carrier material in any suitable manner either during preparation of the support or before or after the addition of the platinum metal and rhenium components. The halogen component is typically combined with the alumina carrier material in amounts sufficient to result in the final catalyst containing about 0.1 to about 1.5 wt. percent halogen and preferably about 0.7 to about 1.2 wt. percent halogen.

As indicated above, the catalyst which is regenerated by the subject method also contains a sulfur component. A portion of this sulfur component may be derived from sulfur incorporated in the catalyst during a presulfiding operation with a suitable sulfur-containing compound such as hydrogen sulfide. Another source of the sulfur contained in the catalyst is the presence of sulfur or sulfur-containing compounds in the charge stock which is contacted with the subject catalyst at conversion conditions. Even in the best run plants, some sulfur may also be derived from plant hardware due to previous exposure of same to hydrogen sulfide. In some cases, sulfur may be deliberately injected into the hydrocarbon conversion process utilizing this catalyst in order to selectively poison same. Regardless of the source of sulfur, the catalyst regenerated by the method of the present invention will contain about 0.01 to about 5 wt. percent sulfur, and, more commonly, about 0.05 to 1 wt. percent sulfur, when it is subjected to the method disclosed herein.

The catalyst regenerated by the method disclosed herein also contains an alumina carrier material. The alumina material is typically a porous, adsorptive, high surface area support having a surface area of about 25 to about 500 or more m.$^2$/gm. Suitble alumina materials are the crystalline aluminas known as gamma-, eta-, and theta-alumina, with gamma- or eta-alumina giving best results. In addition, in some embodiments the alumina carrier material may contain minor proportions of other well known refractory inorganic oxides such as silica, zirconia, magnesia, etc. However, the preferred carrier material consists essentially of gamma- or eta-alumina; in fact, an especially preferred alumina carrier material has an apparent bulk density of about 0.30 gm./cc. to about 0.70 gm./cc. and surface area characteristics such as the average pore diameter is about 20 to about 300 angstroms, pore volume is about 0.10 to about 1.0 ml./gm. and the surface area is about 100 to about 500 m.$^2$/gm. An exemplary procedure for preparing a preferred alumina carrier material comprising spherical particles of relatively small diameter is given in the teachings of U.S. Pat. 2,620,314.

After impregnation of the catalytic components into the alumina carrier material, the resulting composite is typically subjected to a conventional drying step at a temperature of about 200° F. to about 600° F. for a period of about 2 to 24 hours. Thereafter, the dried composite is typically calcined at a temperature of about 700° F. to about 1100° F. in an air stream for a period of about 0.5 to 10 hours. Moreover, conventional pre-reduction and presulfiding treatments are typically performed in the preparation of catalytic composites which are regenerated by the method of the present invention. In fact, it is preferred to incorporate about 0.05 to about 0.5 wt. percent of sulfur component into the subject catalyst by a conventional presulfiding step.

In one preferred embodiment, the catalyst regenerated by the present invention is a combination of a platinum component, a chlorine component, a rhenium component and a sulfur component with an alumina carrier material. These components are preferably present in amounts sufficient to result in the catalyst containing, on an elemental and carbon-free basis, about 0.7 to 1.2 wt. percent chlorine, about 0.1 to about 0.4 wt. percent rhenium, about 0.05 to about 1 wt. percent sulfur and an amount of platinum sufficient to result in an atomic ratio of platinum to rhenium of about 1.5:1 to about 10:1.

As indicated hereinbefore, the principal utility for the subject catalyst is in a hydrocarbon conversion process wherein a dual-function hydrocarbon conversion catalyst having a hydrogenation-dehydrogenation function and an acid-acting function has been traditionally used; for example, these catalysts are used in a reforming process with excellent results. In a typical reforming process, a hydrocarbon charge stock boiling in the gasoline range and hydrogen are contacted with the catalyst of the type described above in a conversion zone at reforming conditions. The hydrocarbon charge stock will typically comprise hydrocarbon fractions containing naphthenes and paraffins that boil within the gasoline range. The preferred class of charge stock includes straight run gasolines, natural gasolines, synthetic gasolines, etc. The gasoline charge stock may be a full boiling range gasoline having an initial boiling point of about 50 to about 150° F., and an end boiling point within the range of about 325 to 425° F., or it may be a selective fraction thereof which generally will be a higher boiling fraction commonly referred to as a heavy naphtha—for example, a naphtha boiling in the range of $C_7$ to 400° F. provides an excellent charge stock. In general, the conditions used in the reforming process are: a pressure of about 50 to about 1000 p.s.i.g. with the preferred pressure being 100 to about 600 p.s.i.g., a temperature of about 800 to about 1100° F. and preferably about 900 to about 1050° F., a hydrogen to hydrocarbon mole ratio of about 2 to about 20 moles of $H_2$ per mole of hydrocarbon and preferably about 4 to about 10 moles of $H_2$ per mole of hydrocarbon, and a liquid hourly space velocity (which is defined as the equivalent liquid volume flow rate per hour of the hydrocarbon charge stock divided by the volume of the bed of catalyst particles) of about 0.1 to about 10 hr.$^{-1}$, with a value in the range of about 1 to about 3 hr.$^{-1}$ giving best results.

When the catalysts of the type described above are employed in the conversion of hydrocarbons, particularly the reforming process outlined above, the activity, selectivity, and stability of these catalysts are initially quite acceptable. For example, in a reforming process this type of catalyst has several singular advantages, among which are increased $C_5+$ yield, decreased rate of coke laydown on the catalyst, increased hydrogen make, enhanced stability of both $C_5+$ yield and temperature necessary to make octane, and excellent catalyst life before regeneration becomes necessary. However, the gradual accumulation of coke and other deactivating carbonaceous deposits on the catalyst will eventually reduce the activity and selectivity of the process to a level such that regeneration is desirable. Ordinarily, regeneration becomes desirable when about ½ to about 25 or more percent by weight of carbonaceous deposits have been formed upon the catalyst.

When the performance of the catalyst has decayed to the point where it is desired to regenerate the catalyst, the introduction of the hydrocarbon charge stock into the conversion zone containing the catalyst is typically stopped. Thereafter, the regeneration method of the present invention is performed either in situ or the catalyst may be unloaded from the conversion zone and regenerated in an off-line facility.

It is to be carefully noted that it is an essential feature of the subject regeneration method that the composition of the gas streams used in the various steps thereof are carefully controlled. In particular, it is a critical feature of the present invention that the gas streams used during the carbon-burning step and the oxygen-treating step are substantially free of compounds of sulfur—particularly, oxide of sulfur and $H_2S$. Likewise, it is essential that the hydrogen stream used during the reduction step be substantially free of both water and compounds of sulfur such as $H_2S$. It is, therefore, evident that the gas streams used in each of the steps of the present invention may be once-through streams or recycle streams; provided that in this latter case, the recycle streams are treated by conventional techniques to insure the absence of these detrimental constituents therefrom. Furthermore, it is to be noted that the temperatures given hereinafter for each of the steps refer to the temperature of the gas stream used therein just before it contacts the catalyst, and that the composition of the gas streams utilized are given in mole percent which are, of course, substantially the same as when expressed in volume percent for the gas streams, temperatures and pressures used herein.

According to the present invention, the first step of the regeneration procedure involves subjecting the deactivated catalyst to contact with a substantially sulfur-free hydrogen stream at conditions selected to strip sulfur from the catalyst. This sulfur-stripping step is preferably conducted at a relatively high temperature of about 350 to about 600° C., with best results obtained at about 450 to 550° C. Similarly, the pressure utilized is about 1 to about 50 atmospheres, with best results obtained when a relatively high pressure is utilized in conjunction with a relatively high temperature. Likewise, the gas hourly velocity can be selected from a relatively broad range of about 100 to 25,000 hr.$^{-1}$. This sulfur-stripping step is performed for a period extending until the resulting effluent gas stream is substantially free of hydrogen sulfide: that is, less than about 10 vol. p.p.m. and preferably less than 1 vol. p.p.m. The hydrogen stream utilized in this step can be a once-through stream or a recycle stream provided, in the latter case, suitable arrangements are made to scrub $H_2S$ from the recirculated gas stream. An acceptable scrubbing procedure involves, for example, contacting the effluent gas stream with a strong basic solution such as an aqueous solution of an alkali metal or alkaline earth salt of a weak acid. A preferred scrubbing procedure for this step and subsequent steps involves scrubbing with a solution of sodium hydroxide which is maintained at a pH of about 7 to 8. In a commercial reforming plant, this scrubbing operation can easily be performed by circulating a basic solution from the hydrogen separator to the inlet to the effluent cooling means with suitable addition of fresh solution and withdrawal of spent solution to maintain the desired pH level.

This sulfur-stripping step is to be sharply distinguished from the conventional volatile hydrocarbon-stripping step which is ordinarily performed during the shutdown procedure when the catalyst has deactivated and is taken off stream. It is customary for platinum metal-containing catalysts to perform this volatile hydrocarbon-stripping step with a hydrogen-containing stream; however, the function of this stripping step is to remove volatile hydrocarbons and it is terminated when the effluent gas stream becomes free of same. Thus, this conventional stripping step ordinarily is completed in about .5 to about 2 hours. In sharp contrast, the sulfur stripping step required by the present invention lasts until the effluent gas stream is substantially free of hydrogen sulfide, which is ordinarily a much longer period of about 15 to 30 or more hours, depending upon the exact stripping conditions utilized and the amount of sulfur initially on the catalyst.

Although it is not particularly preferred, an alternative mode of operation of this sulfur-stripping step involves contacting a substantially sulfur-free mixture of hydrogen and charge stock with the sulfur-containing catalyst at conditions selected to convert hydrocarbons and to strip sulfur. This contacting is usually performed with recycle gas scrubbing, as explained hereinbefore, for a period of time extending until the hydrogen stream recovered from this contacting step is substantially free of hydrogen sulfide; that is, less than about 10 vol. p.p.m., and preferably less than 1 vol. p.p.m.

Following this sulfur-stripping step, residual hydrogen is purged from contact with the resulting catalyst either by drawing a suitable vacuum in the zone containing the catalyst or by purging with an inert gas or a combination of these. After hydrogen is purged from contact with the catalyst, the next step involves burning carbon or coke from the catalyst. This involves subjecting the sulfur-stripped catalyst to contact with a substantially sulfur-free first gaseous mixture comprising about 0.3 to about 2 mole percent $O_2$ and an inert gas such as nitrogen, helium, carbon dioxide, etc. Preferably, this first gaseous mixture also contains about 0.1 to about 4 mole percent $H_2O$. The conditions utilized in this step are: a temperature of about 375 to about 500° C., with best results obtained at about 400° C.; a pressure sufficient to maintain the flow of this first gaseous mixture through the zone containing the catalyst, and preferably about 1 to about 7 atm.; and a gas hourly space velocity (defined as the volume rate of flow of the gas stream per hour at standard conditions divided by the volume of the bed of catalyst particles) of about 100 to about 25,000 hr.$^{-1}$. This carbon-burning step is performed for a period extending until no further substantial combustion of carbonaceous material is observed. In general, depending obviously upon the amount of carbonaceous materials present on the catalyst, a carbon-burning period of about 5 to about 30 or more hours is adequate. During this burning step, it is a good practice to maintain the temperature difference across the zone containing the catalyst at a value of about 50° C. or less by a suitable adjustment of $O_2$ concentration in the first gaseous mixture or by adjustment of flow conditions or temperature of this first gaseous mixture. The purpose of this last limitation is the prevention of high temperature "hot spots" in the bed of catalyst which can permanently deactivate same. The end of this step can be conveniently determined in a number of different ways: one involves monitoring the amount of $O_2$ contained in the effluent gas stream withdrawn from contact with the catalyst—when it reaches substantially the same value as in the influent gas stream, then combustion is substantially complete; another way involves measuring the temperature difference across the zone containing the catalyst— when this parameter drops to a level of about 5° C., then combustion is substantially complete. For a multi-reactor system, the beds of catalyst are preferably burnt in series; and, accordingly, it is the temperature difference across or amount of $O_2$ in the effluent gas stream from the last reactor in series that would control for the purposes of these tests. Excellent results have been obtained in this carbon-burning step when the inlet temperature to the vessel containing the catalyst is held at about 400° C., and the temperature difference across the vessel held to a value of about 30° C. during the course of this step. In addition, excellent results are obtained here when the amount of $O_2$ in this first gaseous mixture is about 0.6 mole percent.

The next essential step of the regeneration method involves treating the catalyst resulting from the carbon-burning step with a substantially sulfur-free second gaseous mixture comprising about 0.5 to about 10 mole percent $O_2$ and an inert gas which is typically nitrogen. Preferably, this second gaseous mixture contains a minor amount of water. The temperature utilized in this second step is selected from the range of about 500 to about 550° C., with best results obtained at about 525° C. The other conditions utilized in this step are preferably the same as used in the carbon-burning step. The duration of this step is preferably about 0.5 to about 10 hours, with excellent results usually obtained in about 1 to about 5 hours. The function of this oxygen-treating step is to remove trace amounts of carbonaceous materials which were not burned off during the first step and to convert the metallic components of the catalyst (i.e. the platinum group and rhenium components) to a highly oxidized state. Excellent results are obtained here with a second gaseous mixture containing about 5 mole percent $O_2$ at a temperature of about 525° C. In general, the preferred mode for changing from the carbon-burning step to the oxygen-treating step involves a gradual increase in the amount of oxygen in the gaseous mixture being charged to the zone containing the catalyst, although, in some cases, with experience this transition can be a relatively abrupt one. After the amount of oxygen is increased and no substantial temperature rise across the zone containing the catalyst is observed, the temperature of the gas stream can be increased. The purpose of this gradual transition is to prevent the development of a substantial temperature rise in the catalyst bed due to incomplete removal of carbonaceous material during the carbon-burning step.

Following this oxygen-treating step, it is generally preferred, but not essential, to adjust the halogen content of the resulting catalyst. This optional halogen-adjustment step involves subjecting the catalyst resulting from the oxygen-treating step to contact with a substantially sulfur-free gaseous mixture comprising about 1 to about 30 mole percent $H_2O$ and about 0.01 to about 1.5 mole percent of a halogen or a halogen-containing compound and air or an inert gas such as nitrogen. A preferred gaseous mixture for use in this step comprises an air stream having water and HCl or a HCl-producing compound admixed therewith. Although a halogen gas such as chlorine or bromine may be used in this step, best results are obtained in this step when the halogen-containing compound is hydrogen chloride. In fact, a preferred procedure involves the injection of an aqueous solution of hydrogen chloride into the air stream used in an amount sufficient to result in a gaseous mixture comprising about 1 to 30 mole percent $H_2O$, about 0.01 to about 1.5 mole percent HCl and air. The mole ratio of the water to halogen used in this step is an important parameter. When HCl or an HCl-producing compound is used in this step, good results are obtained when the mole ratio of $H_2O$ to HCl ranges from about 20:1 to 100:1, with a mole ratio of about 50:1 to about 60:1 being especially preferred. The halogen-adjustment step is preferably conducted at a temperature of about 400 to about 550° C., and at a pressure of about 1 to about 7 atm. for a period of about 1 to about 10 hours with excellent results obtained in a period of about 3 to 5 hours at a temperature of about 525° C. The gaseous hourly space velocity used for this step is preferably about 100 to about 5000 hr.$^{-1}$. The purpose of this step is to increase the halogen content of the catalyst and restore it to a value of about 0.1 to about 1.5 wt. percent of the catalyst and preferably about .7 to about 1.2 wt. percent of the regenerated catalyst, calculated on an elemental basis.

After the oxygen-treating step or the optional halogen-adjustment step, the catalyst is thereafter purged with a substantially water-free inert gas stream to displace oxygen and water therefrom for a period of time which can be easily determined by monitoring the effluent gases from the zone containing the catalyst to determine when they are substantially free of oxygen and water. This purge step is preferably performed at a relatively high temperature; for example, 500 to 600° C. As indicated hereinbefore, it has been ascertained that for this high ratio catalyst (i.e. platinum group melt to rhenium greater than 1:1), it is essential that the catalyst be carefully dried before the subsequent reduction step is performed. In order to accomplish this, it is essential that this drying step be conducted with a substantially water-free inert gas stream for a period extending until the resulting effluent gas stream contains less than 100 mole p.p.m. $H_2O$. In many cases, it is a convenient mode of operation to continuously circulate an inert gas stream through the catalyst bed, then to dry the effluent gas stream with a suitable drying means and then to recycle the dried stream to the catalyst bed.

Upon completion of this purge step, the final essential step of the present invention is commenced. It involves contacting the purged catalyst with a substantially water-free and sulfur-free hydrogen stream at a pressure of about 0.1 to about 15 atm. or more and at a temperature of about 400 to about 600° C., with best results obtained at a temperature of about 500 to 550° C. In some cases this hydrogen stream may also contain an inert gas such as nitrogen. This step is preferably conducted for about 0.5 to about 5 hours. It is important that the hydrogen stream used here be substantially water-free, and if continuous recycle of the effluent streams is employed, a drying means should be used to dry this recycle stream and insure this condition is achieved. A preferred mode of operation for this reduction step involves performing it in two substeps: the first involving a relatively low hydrogen pressure of about 0.1 to 3 atmospheres and the second involving a relatively high hydrogen pressure of about 4 to about 10 atmospheres. It is understood that these pressure limitations refer to hydrogen partial pressure when the hydrogen is admixed with an inert gas. In the case where continuous recirculation of the effluent gas stream is practiced in this step, it is a good practice to perform a purge operation between these two substeps by evacuating the vessel containing the catalyst down to a low pressure and purging with high purity hydrogen. The overall purpose of this reduction step is to reduce both metallic components essentially to the elemental state.

Following this reduction step, the hydrocarbon conversion process in which the catalyst is utilized may be restarted by once again charging the hydrocarbon stream in the presence of hydrogen to the zone containing the catalyst at conditions selected to produce the desired product or products. In the preferred case this involves re-establishing reforming conditions within the zone containing the catalyst. In some uses, it is beneficial to inject a halogen or halogen-containing compound into the zone containing the catalyst during this start-up. Typically, this halogen is added in an amount of about 0.05 to about 0.25 wt. percent of the catalyst.

The following example is given to illustrate further the regeneration method of the present invention and to indicate a preferred mode of operation of same. It is understood that this example is given for the sole purpose of illustration.

EXAMPLE

This example demonstrated the regeneration method of the present invention by contrasting the results obtained during the course of a first cycle of operation with the fresh, undeactivated catalyst for a catalyst life of 90 barrels of charge per pound of catalyst (abbreviated herein as BPP) with the results from the second cycle of operation of the same catalyst after it has been subjected to the regeneration method of the present invention.

The catalyst was manufactured using $\frac{1}{16}$ inch spherical particles of gamma-alumina carrier material prepared by the method disclosed in U.S. Pat. No. 2,620,314. The carrier material had an apparent bulk density of about 0.5 gm./cc., a pore volume of about 0.4 cc./gm. and a surface area of about 160 m.$^2$/gm. These spherical particles were then impregnated with an aqueous solution containing chloroplatinic acid, hydrogen chloride and perrhenic acid in amounts sufficient to result in the final catalyst containing 0.55 wt. percent platinum and about 0.2 wt. percent rhenium, calculated on an elemental basis. The impregnated spheres were then dried at about 250° F. for about 2 hours, and thereafter subjected to a high temperature oxidation treatment with an air stream containing $H_2O$ and HCl for about 3 hours at 975° F.

After this oxidation treatment, the particles of catalyst were contacted with a stream of substantially pure hydrogen at a temperature of about 1000° F. for abou 1 hour. Thereafter, the catalyst particles were presulfided with a gas stream containing $H_2$ and $H_2S$ in a mole ratio of about 10:1 at a temperature of about 1000° F. An analysis of the fresh catalyst showed it to contain 0.55 wt. percent platinum, 0.2 wt. percent rhenium, 0.87 wt. percent chloride, and 0.1 wt. percent sulfur. This corresponds to a platinum to rhenium atomic ratio of about 2.64:1

The resulting catalyst was then utilized in a reforming plant to reform a Mid-Continent naphtha having the properties shown in Table I.

Table I.—Properties of Mid-Continent naphtha

| | |
|---|---|
| API gravity, ° API at 60° F. | 56.0 |
| Initial boiling point, ° F. | 216 |
| 5%, ° F. | 222 |
| 10%, ° F. | 225 |
| 30%, ° F. | 239 |
| 50%, ° F. | 254 |
| 70%, ° F | 282 |
| 90%, ° F. | 320 |
| 95%, ° F. | 340 |
| End boiling point, ° F. | 370 |
| Sulfur, wt. p.p.m. | 0.1 |
| Water, wt. p.p.m. | 7 |
| Nitrogen, wt. p.p.m. | 0.1 |
| Paraffins, vol. percent | 47 |
| Naphthenes, vol. percent | 46 |
| Aromatics, vol. percent | 7 |
| Octane number, F–1 clear | 49.3 |

This reforming plant comprised a series of 3 reactor vessels containing fixed beds of the previously described catalyst, a hydrogen separator, a recycle gas dryer, a debutanizer column, a charge heater, two interheaters, an effluent cooling means, and other conventional equipment such as pumps, compressors, control means, etc., the details of which are well known to those skilled in the art.

The flow scheme utilized in this reforming plant was as follows: the charge stock and a hydrogen recycle stream were commingled, heated to conversion temperature in the charge heater and passed into the lead reactor; an effluent stream was withdrawn from the lead reactor, reheated in one of the interheaters and passed into the intermediate reactor; another effluent stream was then withdrawn from the intermediate reactor, reheated in the inter heater and passed to the tail reactor; yet another effluent stream was then withdrawn from the tail reactor, cooled in the effluent cooling means to a temperature of about 100° F. and passed to the hydrogen separator wherein a hydrogen-rich gas phase separated from a hydrocarbon-rich liquid phase; the hydrogen-rich gas phase was then withdrawn, a portion of it was vented from the system as excess recycle gas in order to maintain pressure control and another portion was recompressed and recycled to the lead reactor; and the liquid phase from the separator was passed to the debutanizer column wherein light ends were taken overhead and a $C_5+$ reformate recovered as bottoms.

The reforming plant was operated in the manner described with this charge stock for a catalyst life of about 90 barrels of charge per pound of catalyst contained therein. The conditions utilized were: a pressure in the hydrogen separator of 350 p.s.i.g., a liquid hourly space velocity based on the total amount of catalyst in all 3 reactors of 1.4 hr.$^{-1}$, a hydrogen to hydrocarbon mole ratio of 6.6:1 and an average inlet reactor temperature which was continuously adjusted throughout the run in order to make a $C_5+$ reformate having an octane number of 96 F–1 clear.

Toward the end of this first period of onstream operation, the performance of the catalyst deteriorated to the point where regeneration became desirable. Accordingly, at a catalyst life of about 90 barrels per pound the charge stock was cut out from the system, and the system blocked in by shutting off the charge line, the line leading to the debutanizer column, and the line wherein excess recycle gas is withdrawn. Thereafter, in the first step of the regeneration method, a substantially sulfur-free hydrogen stream was continuously introduced into the plant and recirculated throughout the plant at a temperature of about 480° C. with continuous withdrawal of net separator gas until the effluent stream withdrawn from the last reactor contained less than 1 mole p.p.m. of $H_2S$. Hydrogen was then purged from the plant using a nitrogen stream and the plant cooled down to a temperature of about 400° C. Thereafter, a caustic solution containing about 3 to 3½ wt. percent sodium hydroxide was charged to the hydrogen separator and continuously circulated from the hydrogen separator to the inlet to the effluent cooling means in a manner calculated to result in intimate contact between the circulating caustic stream and the regenerating gas stream. The pH of the caustic was maintained in the range of 7.5 to 8 by the continuous addition and withdrawal of caustic from this scrubber.

Carbon was then burned from the catalyst by continuously circulating a first gaseous mixture containing $O_2$, $H_2O$ and $N_2$ through the plant at a temperature of 400° C. until no further substantial combustion of carbon from the catalyst was observed. The amount of oxygen contained in the regenerating gas stream during this step was held at a level of 0.6 mole percent. The end of this step was determined by monitoring the temperature difference across the tail reactor; when this temperature difference was less than 5° C., this step was considered complete.

After this carbon-burning step, the amount of oxygen contained in the circulating gas stream was increased to about 5 mole percent while maintaining the temperature of the circulating gas stream at about 400° C. Thereafter, the temperature of this circulating gas stream was raised to about 525° C. and held at this level for about 1 hour. It is to be noted that throughout the carbon-burning step and this oxygen-treating step, the recircuated gas stream was being scrubbed free of sulfur oxides by the caustic scrubbing system previously described. At the termination of this step, the inventory of caustic solution present in the hydrogen separator was flushed from the system, and the system evacuated to a pressure substantially less than 1 atmosphere.

Following the oxygen treatment step, the plant was pressured with nitrogen to a pressure of about 50 p.s.i.g., and the nitrogen stream was continuously circulated through the reactors at a temperature of about 525° C. with the effluent cooling means in operation so that condensate collected in the hydrogen separator. This condensate was then drained from the system. After the amount of condensate withdrawn from the hydrogen separator was reduced to a relatively small amount of about 100 cc. per hour, a recycle gas dryer was inserted in the circulating nitrogen stream. The circulation of the nitrogen stream was then continued at a temperature of about 525° C. with recycle gas drying until the amount of water contained in the effluent gas stream withdrawn from the tail reactor was less than 100 mole p.p.m.

After this drying step, hydrogen was injected into the plant and circulated throughout at a relatively high temperature of 510° C. for a period of about 3 hours. The recycle gas dryer was used throughout this step to insure that the hydrogen stream, as it was introduced into the lead reactor, was substantially water-free.

A summary of the specific steps utilized in the regeneration method and of the relevant conditions used in each step is given in Table II.

TABLE II.—SUMMARY OF REGENERATION METHOD

| Composition of gas stream | T., ° C. | P., p.s.i.g. |
|---|---|---|
| Step No.: | | |
| 1 ............ $H_2$ .................................... | 480 | 200 |
| 2 ............ $N_2$ .................................... | 30 | 10 |
| 3 ............ 0.6 mole percent $O_2$, $H_2O$, and $N_2$ .... | 400 | 50 |
| 4 ............ 5 mole percent $O_2$, $H_2O$, and $N_2$ ..... | 525 | 50 |
| 5 ............ Dry $N_2$ ................................ | 525 | 50 |
| 6 ............ Dry $H_2$ ................................ | 510 | 100 |

Thereafter, the reforming operation at the plant was re-established by once again charging the Mid-continent naphtha at reforming conditions. The conditions utilized with the regenerated catalyst were slightly different than that utilized with the fresh catalyst. They were: a separator pressure of 450 p.s.i.g., a liquid hourly space velocity of 1.7 hrs., a hydrogen to hydrocarbon mole ratio of 5.5:1, and an average inlet reactor temperature which was continuously selected in order to produce a $C_5+$ reformate having an octane number of 96 F–1 clear.

The average $C_5+$ yield obtained with the fresh catalyst during the first cycle was approximately 84 liquid volume percent, on a volume percent of charge basis, which stands in contrast to the average value of about 83 volume percent which was obtained with the regenerated catalyst. Similarly, the average hydrogen yield during the first cycle was about 1000 standard cubic feet of $H_2$ per barrel of charge which was in contrast to about 850 standard cubic feet of $H_2$ per barrel of charge obtained with the regenerated catalyst. In addition, the temperature stability of the fresh catalyst was about 0.5° F./BPP, whereas the corresponding value for the deactivated catalyst was about 1° F./BPP.

Allowing for the differences in conditions utilized with the fresh and regenerated catalyst, it can be seen that the regenerated catalyst closely approximates the activity, selectivity and stability characteristics of the fresh catalyst.

I claim as my invention:

1. A method for regenerating a deactivated hydrocarbon conversion catalyst comprising a combination of a platinum group component, a rhenium component, a halogen component and a sulfur component with an alumina carrier material, which catalyst has been deactivated by deposition of carbonaceous material thereon during a previous contacting with a hydrocarbon charge stock at hydrocarbon conversion conditions, said method comprising the sequential steps of:

(a) contacting the deactivated catalyst with a substantially sulfur-free hydrogen stream at a temperature of about 350 to about 600° C. and at a pressure of about 1 to about 50 atmospheres for a period extending until the resulting effluent gas stream is substantially free of hydrogen sulfide;

(b) purging hydrogen from contact with the catalyst from step (a);

(c) subjecting the catalyst resulting from step (b) to contact with a substantially sulfur-free first gaseous mixture containing about 0.3 to about 2 mole percent $O_2$ at a pressure sufficient to maintain the flow of said mixture through the catalyst and at a temperature of about 375 to about 500° C. for a period extending until no further substantial combustion of carbonaceous material is observed;

(d) treating the catalyst resulting from step (c) with a substantially sulfur-free second gaseous mixture containing about 0.5 to about 10 mole percent $O_2$ for a period of about 0.5 to about 10 hours at a temperature of about 500 to about 550° C. and at a pressure sufficient to maintain the flow of said mixture through the catalyst;

(e) purging oxygen and water from contact with the catalyst from step (d) by contacting same with substantially water-free inert gas stream for a period extending until the resulting effluent gas stream contains less than 100 mole p.p.m. water; and (f) subjecting the dried catalyst resulting from step (e) to contact with a substantially water-free and sulfur-free hydrogen stream at a temperature of about 400 to about 600° C. for a final period of about 0.5 to about 5 hours, thereby producing a regenerated hydrocarbon conversion catalyst having activity, selectivity, and stability characteristics equivalent to those possessed initially by the fresh catalyst.

2. A method as defined in claim 1 wherein said platinum group component of the catalyst is platinum or a compound of platinum.

3. A method as defined in claim 1 wherein said halogen component of the catalyst is chlorine or a compound of chlorine.

4. A method as defined in claim 1 wherein said alumina carrier material is gamma- or eta-alumina.

5. A method as defined in claim 1 wherein said catalyst contains, on an elemental and carbon-free basis, about 0.1 to about 1.5 wt. percent halogen, about 0.01 to about 1 wt. percent rhenium and about 0.05 to about 1 wt. percent sulfur and an amount of platinum group metal sufficient to result in an atomic ratio of platinum group metal to rhenium of about 1.5:1 to about 10:1.

6. A method as defined in claim 1 wherein said catalyst comprises a combination of a platinum component, a chloride component, a rhenium component and a sulfur component with an alumina carrier material in amounts sufficient to result in a catalyst containing, on an elemental and carbon-free basis, about 0.7 to about 1.2 wt. percent chlorine, about 0.1 to about 0.4 wt. percent rhenium, 0.05 to about 1 wt. percent sulfur and an amount of platinum sufficient to result in an atomic ratio of platinum to rhenium of about 1.5:1 to about 10:1.

7. A method as defined in claim 1 wherein the amount of oxygen contained in the first gaseous mixture is about 0.6 mole percent.

8. A method as defined in claim 1 wherein the amount of oxygen contained in said second gaseous mixture is about 5 mole percent.

9. A method as defined in claim 1 wherein the temperature utilized in step (c) is about 400° C. and wherein the temperature utilized in step (d) is about 525° C.

10. A method as defined in claim 1 wherein step (e) is conducted at a temperature of about 500 to about 550° C.

11. A method as defined in claim 1 wherein step (f) is conducted at a temperature of about 510° C.

12. A method as defined in claim 1 wherein step (f) is conducted in two substeps: the first involving a relatively low hydrogen pressure of about 0.1 to 3 atmospheres and the second involving a relatively high hydrogen pressure of about 4 to about 10 atmospheres.

13. A method as defined in claim 1 wherein, with respect to said catalyst, the atomic ratio of platinum group metal to rhenium metal is greater than 1:1.

References Cited

UNITED STATES PATENTS

| | | | |
|---|---|---|---|
| 2,853,435 | 9/1958 | Evering et al. | 208—140 X |
| 3,011,967 | 12/1961 | Schmitkons et al. | 208—140 X |
| 3,144,402 | 8/1964 | Schwarzenbek et al. | 208—140 |
| 3,296,118 | 1/1967 | Czajkowski et al. | 208—139 X |
| 3,400,073 | 9/1968 | Schwarzenbek et al. | 208—140 |
| 3,415,737 | 12/1968 | Kluksdahl | 208—139 |
| 3,496,096 | 2/1970 | Kluksdahl | 252—419 X |

FOREIGN PATENTS

| | | | |
|---|---|---|---|
| 744,459 | 2/1956 | Great Britain | 252—411 |

DANIEL E. WYMAN, Primary Examiner

P. E. KONORKA, Assistant Examiner

U.S. Cl. X.R.

208—140; 252—415